(12) United States Patent
McLoone et al.

(10) Patent No.: US 6,700,564 B2
(45) Date of Patent: Mar. 2, 2004

(54) INPUT DEVICE INCLUDING A WHEEL ASSEMBLY FOR SCROLLING AN IMAGE IN MULTIPLE DIRECTIONS

(75) Inventors: Hugh McLoone, Bellevue, WA (US); James Cauthorn, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 181 days.

(21) Appl. No.: 09/843,794

(22) Filed: Apr. 30, 2001

(65) Prior Publication Data

US 2002/0158844 A1 Oct. 31, 2002

(51) Int. Cl.[7] ................................................. G09G 5/00
(52) U.S. Cl. ........................ 345/156; 345/163; 345/168; 345/973; 345/684
(58) Field of Search ................................. 345/684–688, 345/784–788, 156–169, 973; 273/148 B; 463/37–38

(56) References Cited

U.S. PATENT DOCUMENTS

| | | | |
|---|---|---|---|
| 4,712,101 A | * 12/1987 | Culver | 340/710 |
| 4,720,703 A | * 1/1988 | Schnarel, Jr. et al. | 340/709 |
| 5,235,868 A | * 8/1993 | Culver | 340/706 |
| 5,477,508 A | * 12/1995 | Will | 368/189 |
| 5,530,455 A | 6/1996 | Gillick et al. | |
| 5,808,568 A | 9/1998 | Wu | |
| 5,952,997 A | 9/1999 | Hu | |
| 5,963,197 A | 10/1999 | Bacon et al. | |
| 6,075,518 A | 6/2000 | Pruchniak | |
| 6,128,006 A | 10/2000 | Rosenberg et al. | |
| 6,323,844 B1 | * 11/2001 | Yeh et al. | 345/166 |

OTHER PUBLICATIONS http://www.mside.net/microscrollii.html, MSIDE.net, showing Micro Scroll II mouse from Micro, 2 sheets, Dec. 2000.
http://www.contourdesign.com/rollerbar.htm, Contour Design—RollerBar Mousing Station—Optical Technology, 2 sheets, Jan., 2001 and 1 sheet press release dated Nov. 29, 2000.
http://www.mousetrapper.dk, Mouse Trapper product description, 12 color sheets including origianl Danish language and English translation as performed by Translation Experts Ltd. service, date of product release unknown but prior to filing date of application.

* cited by examiner

Primary Examiner—Lun-Yi Lao
(74) Attorney, Agent, or Firm—Banner & Witcoff, Ltd.

(57) ABSTRACT

A computer input device having a housing and an engagable scroll wheel. The scroll wheel is rotatable about an axis to preferably cause vertical scrolling of an image on a display. The rotatable member is laterally movable relative to the housing. A sensor is preferably positioned within the housing for sensing lateral movement of the rotatable member. In response to sensed lateral movement of the rotatable member, the image is horizontally scrolled, preferably in the direction of the lateral movement. The scrolling speed can be affected relative to the amount of displacement of the rotatable member and/or the amount of time that the rotatable member is displaced a predetermined amount. The computer input device having the rotatable member may take the form of a keyboard, a mouse, a trackball device, or another type of computer input device.

26 Claims, 7 Drawing Sheets

INPUT DEVICE INCLUDING A WHEEL ASSEMBLY FOR SCROLLING AN IMAGE IN MULTIPLE DIRECTIONS

The present invention relates to an input device including an assembly for scrolling an image in multiple directions relative to a display screen. More particularly, the present invention relates to a peripheral input device, such as a mouse or keyboard, that may be operatively connected to a host computer and includes a scroll wheel assembly that can move an image in multiple axes relative to a display screen.

BACKGROUND OF THE INVENTION

Scroll wheels have been provided on computer mice and used by computer operators to move an image relative to a display screen of a host computer. A scroll wheel assembly includes a rotatable scroll wheel and a sensor that are typically included in a housing for a peripheral computer device such as a mouse. Typically, a portion of the scroll wheel protrudes upwardly out of an opening in its housing and is rotated in order to vertically scroll the image along the screen. An example of a mouse including a known scroll wheel assembly is described in U.S. Pat. No. 5,912,661, entitled "Z-ENCODER MECHANISM" which is hereby fully incorporated by reference.

Scrolling, as used herein, describe the movement of an image relative to a display screen in a particular direction as such term is commonly used in the art. For example, the term "scroll down" as used herein relates to moving the viewable contents of a file (such as a text document or image) relative to display screen by an amount to produce an effect of moving down in the document or image. Similarly, the terms scroll up, scroll left and scroll right relate to moving the viewable contents of a file relative to a screen by an amount to produce an effect of moving in the document or image up, left, and right, respectively. The term scrolling as used herein also includes panning, which is the automatic scrolling of an image.

In operation, a conventional scroll wheel is normally rotated about a first, transversely extending axis secured within a housing in order to scroll the image up and down (vertically) relative to the display screen. As the scroll wheel is rotated, an encoder senses the rotation of an encoder wheel and delivers a corresponding signal to a host computer which in turn can be used to move an image as is known in the art and disclosed in U.S. Pat. No. 5,912,661. This can occur without the user moving the position of the mouse and/or the cursor. However, many types of documents, such as spreadsheets, are usually wider than the width of the display screen and the user may want to scroll horizontally across the screen to see the entire file. When the user needs to move the image horizontally across the display screen, the user must typically stop what he or she is doing and perform a number of tedious and potentially frustrating steps. These include locating a graphical user interface in the form of a horizontal scroll bar usually located near the bottom of the display, positioning the cursor on the scroll bar, and then rotating the wheel. Locating the scroll bar can be very difficult for people with bad eyesight, small display screens and/or poor hand-eye coordination. As a result, the user will waste time and delay the completion of his project while fumbling to find the bottom horizontal scroll bar. These delays can cause the user great frustration and unnecessary stress that is magnified when he or she is operating under a deadline. Alternative graphically assisted tools for horizontal scrolling requiring cursor repositioning have similar drawbacks.

If the user does not accurately position the cursor over the horizontal scroll bar, the image will not scroll horizontally with respect to the display screen as he or she operates the mouse cursor of the graphical interface or rotates the mouse wheel. Instead, when using the mouse cursor on the graphical interface, nothing happens until he or she tries again to position the mouse cursor correctly on the scroll bar's points of operation. Or, when using the mouse wheel, the image will move vertically relative to the display screen and erroneously change the displayed image. These errors will force the user to take additional steps to reposition the desired image on the display screen. These steps include the user confirming that the cursor is not positioned on the horizontal scroll bar and rotating the scroll wheel in the opposite direction to return the image to its previous position. Unfortunately, repositioning an image can lead to errors if the image is being amended. For example, the user may not return the image to its previous position. As a result, he may amend the wrong section of the image. Even if the proper image or portion of an image is returned to the display screen, the user must still attempt to locate the bottom, horizontal scroll bar a second time in order to finally move the image in a horizontal direction.

Microside Corporation of Miami, Fla., offers a "Micro Scroll II" mouse that permits a user to scroll an image in multiple perpendicular directions. This mouse includes a first rotatable wheel for scrolling an image up and down, and a second, separate rotatable wheel for scrolling an image left and right. The rotatable wheels are oriented so they extend and rotate in planes that are perpendicular to each other. The two scroll wheels are independently operable. However, this arrangement has drawbacks as the two wheels takes up valuable upper surface area on the mouse which could be used for supporting the hand of the user or for additional input keys. Further, the two wheels have been made to be a small size to accommodate both wheels on the upper surface of the mouse. The smaller sized scroll wheels make the scrolling more difficult to control. Additionally, the location of the horizontal scroll wheel is inconvenient for effective control. Further, with this design, it is difficult to easily reach and manipulate one of the wheels, as he or she must reposition his or her hand on the mouse to avoid reaching without awkwardly finger manipulation.

SUMMARY OF THE INVENTION

One aspect of the present invention relates to a peripheral device for use with a computer to scroll an image relative to an image display screen along perpendicular axes. The device comprises a housing that has at least one opening. The device also comprises a scroll wheel assembly that is provided within the housing. The scroll wheel assembly includes a rotatable member positioned within the opening of the housing. The rotatable member is rotatable about an axis that extends within the housing and is laterally movable within the opening relative to the housing. The scroll wheel assembly also includes a movement sensing system that determines when the rotatable member is moved laterally relative to the housing.

Another aspect of the present invention includes a peripheral computer input device for scrolling an image across a display screen in perpendicular directions. The device includes a housing and a scroll wheel assembly. The scroll wheel assembly includes a rotatable member that is laterally movable relative to the housing and a sensor positioned within the housing for sensing lateral movement of the rotatable member. The device also includes a controller coupled to the sensor. The controller is configured to generate a signal to scroll the image across the display screen.

Another aspect of the present invention includes a computer input device for providing scrolling capabilities of an image relative to a display screen in first and second perpendicular scrolling directions. This computer input device includes a housing and a scroll wheel. The scroll wheel is rotatable relative to the housing about an axis to cause scrolling of the image in the first direction. Additionally, the scrolling wheel is displaceable relative to the housing to cause scrolling of the image in the second direction perpendicular to the first direction without the need for repositioning the peripheral device or repositioning the hand on the device.

The present invention also includes a method of scrolling an image relative to a display screen using an input device having a housing and a member that is rotatable relative to the housing. The method includes the step of laterally moving the rotatable member relative to a plane in which the member is rotatable. The method also includes the step of scrolling the image on the display screen in response to the laterally moving step.

The device according to the present invention makes it easy for a user to scroll an image both horizontally and vertically relative to a display screen without repositioning the peripheral device. Additionally, the different types of wheel movements used by the present invention to cause scrolling in the perpendicular directions eliminate problems and frustrations that may result from using the prior art devices.

DETAILED DESCRIPTION OF THE FIGURES

Figure 2:
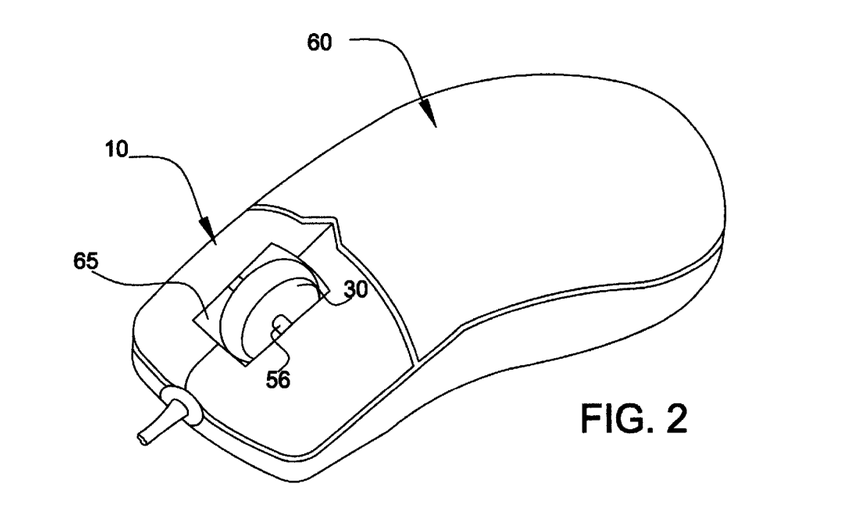
FIG. 2 shows an input device according to one embodiment of the present invention.
Figure 3:
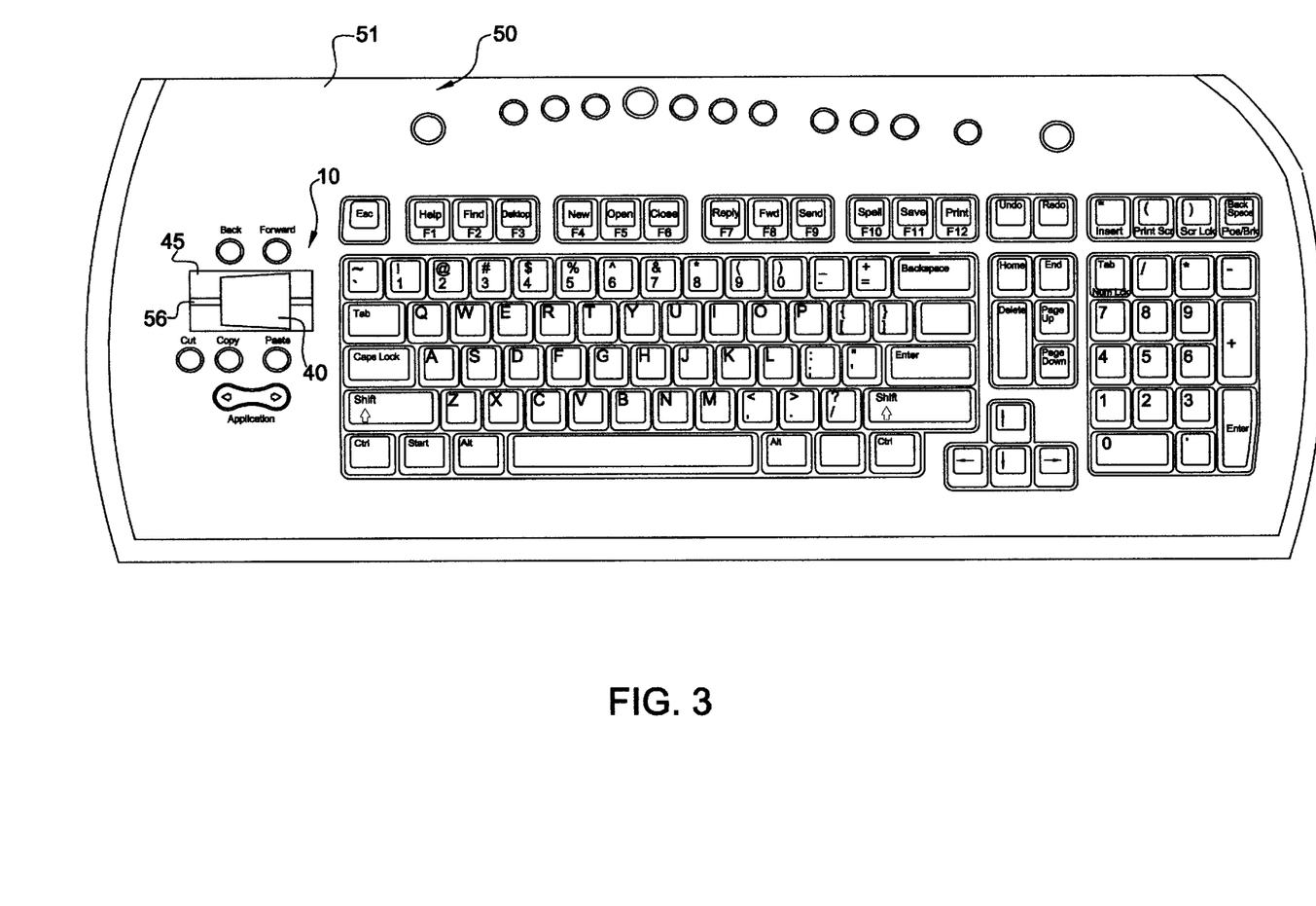
FIG. 3 shows an input device according to another embodiment of the present invention.

As shown in the figures, an exemplary embodiment of the present invention includes a scroll wheel assembly 10 having a rotatable member 30, 40 (scroll wheel) that can be used with different types of computer input devices for scrolling an image 1 in multiple directions and along multiple axes (X, Y) relative to a display screen 2 used with a host computer 8 another type of computing device, or an internet appliance. As shown in FIG. 2, one embodiment of the scroll wheel assembly 10 according to the present invention can be located within a mouse 60. As shown in FIG. 3, another embodiment of the scroll wheel assembly 10 can be located within a keyboard 50. In addition to these illustrated embodiments, the scroll wheel assembly 10 can also be located within other peripheral, computer input devices such as a trackball device or a similar input device. For example, it could also be located in the bezel of a hand-held computer, a larger portable computing device, a web pad, or internet appliance, or could be located on the chassis of a laptop computer. Like the keyboard 50 and the mouse 60, these other known peripheral devices can have wired or wireless connections to the host computer 8 as is known in the art. The scroll wheel assembly 10 can alternatively be located in a computer monitor or in the base portion of a laptop computer. As described in more detail hereinafter, in addition to its normal rotational movement for vertical scrolling, the rotatable member 30, 40 may be moved laterally to horizontally scroll an image on the display screen 2.

As used herein, the term "lateral" to describe motion of the rotatable member includes the general side-to-side movement of a rotatable member 30, 40 within an opening of an input device in a direction that is at an angle to the plane in which the rotatable member 30, 40 is rotated. This side-to-side movement is generally in the direction of the sidewalls of the opening and can be along an axis extending perpendicular to the plane of rotation of the rotatable member 30, 40. Lateral motion also includes axi-lateral motion, which as used herein, is the movement of the rotatable member 30, 40 along the axis about which it rotates. Additionally, lateral motion can include pivoting motion experienced by the rotatable member when it is pivoted in a direction that extends at an angle to its plane of rotation in the direction of the sidewalls of the opening of the input device. As used herein, the terms "displacement" and "translation" of the rotatable member describes all other movement of the rotatable member other than its rotation about the axis about which it rotates.

As shown in FIG. 2, one embodiment of the scroll wheel assembly 10 comprises a rotatable member, such as a circular disk-shaped scroll wheel 30 positioned within an elongated opening 65 in a housing 61 of the mouse 60. A portion of the wheel 30 protrudes away from the outer surface of the mouse 60 so that it can be contacted and manipulated by a user. In a second embodiment, shown in FIG. 3, the rotatable member of the scroll wheel assembly 10 includes an elongated cylindrically shaped wheel 40 secured within an opening 55 of a housing 51 for the keyboard 50.

Like the disk-shaped wheel 30, a portion of the cylindrically shaped wheel 40 protrudes above the keyboard 50 outer surface so that it can be easily contacted and manipulated by a user.

Figure 4:
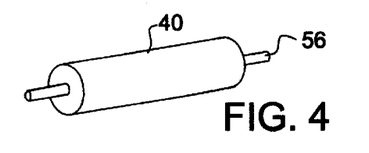
FIGS. 4–6 illustrate alternative shapes for the rotatable members shown in FIGS. 2 and 3.
Figure 5:
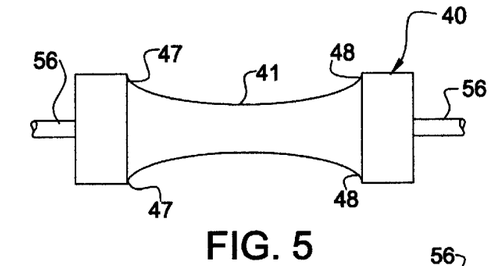
Figure 6:
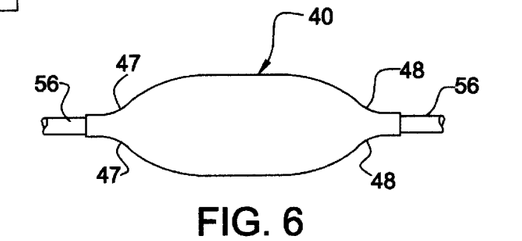

Other shapes capable of rotating relative to a housing can also be used for the rotatable members of the scroll wheel assembly 10. For example, wheel 40 could have a circular cross section of constant diameter as shown in FIG. 4. Alternatively, the wheel 40 could have a circular cross section with a central region 41 that has a reduced diameter (concave profile) as shown in FIG. 5, or a central region 42 with an increased diameter (convex profile) as shown in FIG. 6. The contoured central regions 41, 42 of the wheels 40 shown in FIGS. 4 and 5 are formed between curved side surfaces 47 and 48, respectively. The concave profile of the wheel in FIG. 4 enables the user to place a finger in the central region 41 and move the wheel 40 laterally by pushing left or right against a side surface 47 or 48 (i.e., inside-out manipulation). With the scroll wheel 40 in FIG. 6, the contoured side surfaces 47 and 48 assist in the outside-in manipulation of the wheel 40.

The outer surface of the rotatable wheels 30, 40 of the scroll wheel assembly 10 may include a rubber coating and/or grooves that are contacted by the user's finger in order to enhance scrolling control. Alternatively, the rotatable wheels 30, 40 can be provided with other types of slip resistant arrangements, such as a multi-textured coatings or a knurled surface. With regard to the embodiments illustrated in FIGS. 5 and 6, the contoured regions 47, 48 may be covered by the rubber material or slip resistant material that facilitates both the rotational movement that causes the image 1 to scroll along a Y-axis 4 and the lateral movement that causes the image 1 to scroll along an X-axis 5.

Figure 1:
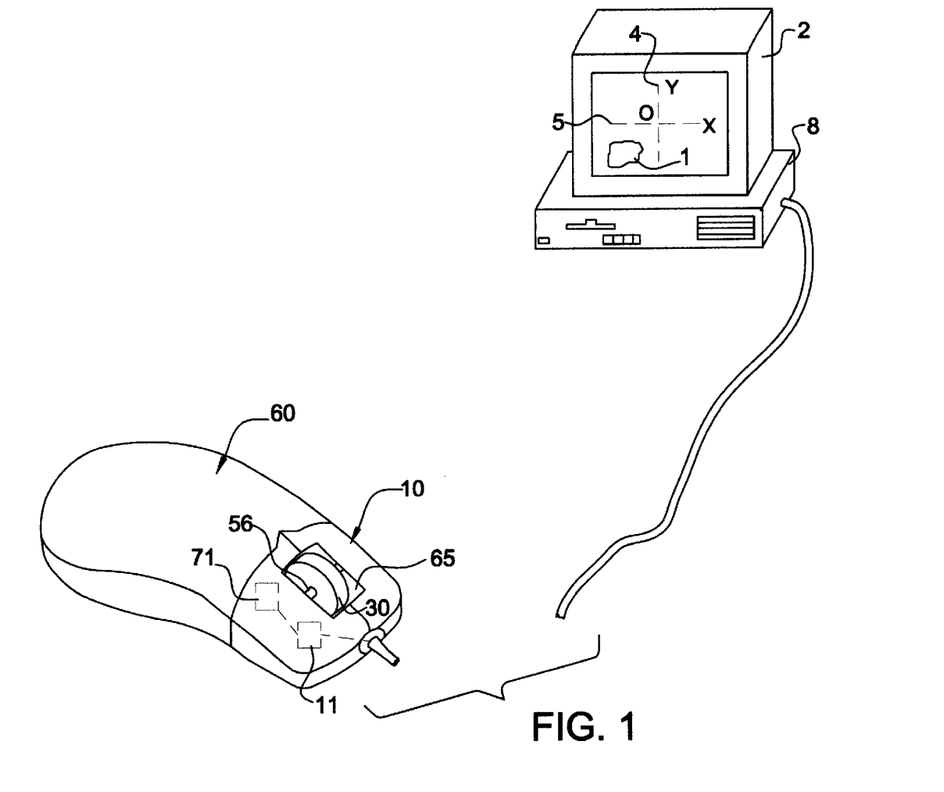
FIG. 1 illustrates an input device according to the present invention for scrolling an image on a display screen of a host computer.

For clarity, the present invention will be discussed as embodied in the keyboard 50 as illustrated in FIG. 3. However, it should be understood that the discussion of the scroll wheel assembly 10 is equally applicable for use in a mouse 60, as illustrated in FIGS. 1 and 2, and the other peripheral devices, for example trackball devices. It should also be understood that the description of the movement of the cylindrical-shaped wheel 40 as a scroll wheel relative to the housing 51 and the scrolling of the image 1 is equally applicable to the disk-shaped wheel 30.

As shown in FIG. 3, the wheel 40 is positioned within the keyboard 50 so that it extends through the opening 55 in the keyboard housing 51. The cylindrical shaped wheel 40 is positioned about and secured to a shaft 56 that defines an axis 52 extending substantially parallel to the length of the keyboard 50 and across opening 55. The wheel 40 can be keyed, adhered or otherwise attached to the shaft 56 in order to prevent relative movement between itself and the shaft 56. Alternatively, the cylindrical shaped wheel 40 and the shaft 56 may be integrally formed together. As described in conjunction with FIGS. 14a–14c, the wheel 40 may be coupled to the shaft 56 in a manner where the wheel 40 may be moved laterally relative to the shaft 56 when moved along the axis 52 but the shaft 56 will rotate with the wheel 40 about the axis 52. In yet another embodiment, not shown, the wheel 40 moves relative to the shaft 56 in rotational and lateral directions, i.e., both along the axis 52 and about the axis 52. The wheel 40 preferably has an outer diameter in the range of about 0.25 inches to about 2.0 inches, and more preferably has an outer diameter in the range of about 0.5 inches to about 1.5 inches. In a preferred embodiment, the diameter of the wheel 40 is about 0.875 inch. The wheel 40 can also have a length along the axis 52 of about 0.25 to about 2.0 inches. In a preferred embodiment, the wheel 40 has a length of about 1.125 inches. Further, in the preferred embodiment as used in the keyboard, the length of the wheel 40 is greater than its diameter.

Figure 7:
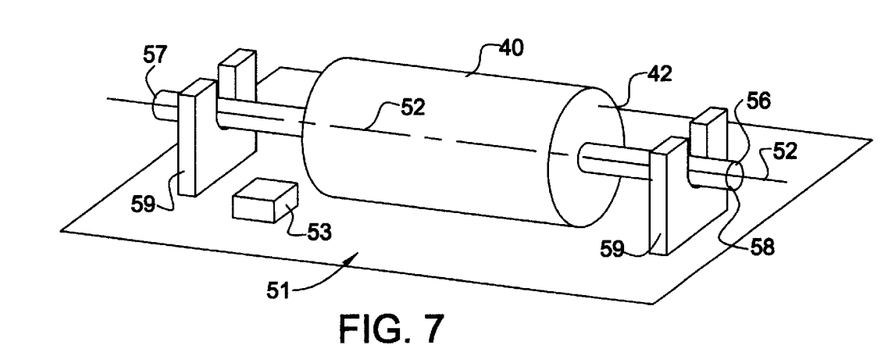
FIG. 7 is a schematic view of a scroll wheel assembly according to one embodiment of the present invention.

The shaft 56 may be coupled to the peripheral device 50, 60 in any desired manner that achieves the described functionality. FIG. 7 illustrates a first embodiment where, a first end 57 and a second end 58 of the shaft 56 are each rotatably and slidably received within support stands 59 with U-shaped openings, rings attached to the interior surface of the housing 51 or other similar supports that permit the shaft 56 to rotate and slide along the axis 52 relative to the keyboard housing 51. Similarly, the supports 59 could also be positioned along the length of shaft 56 so that they are spaced from ends 57, 58.

According to the present invention, when the user wants to scroll the image 1 on the display screen 2 in multiple directions along multiple axes 4, 5, he or she will both rotate and/or laterally move the wheel 40 relative to the keyboard housing 51 to produce vertical and/or lateral scrolling, respectively. In a manner known in the art, when the cylindrical shaped wheel 40 and shaft 56 are rotated by the user, the rotational motion is sensed by a rotational movement sensing system 87 and the image 1 is scrolled in either a positive or a negative vertical direction that extends parallel to the Y-axis 4, i.e., either up or down. Any known sensing system may be used. One rotational movement sensing system 53 that can be included is schematically illustrated in FIG. 7 and disclosed in U.S. Pat. No. 5,912,661 which has been incorporated by reference. As known in the art, this rotational movement sensing system 87 can include a light source, an encoder wheel, and a light detector. Blades on the encoder wheel periodically obstruct the light beam when the wheel 40 is rotated. The detector senses these obstructions and is coupled to a controller 11 to generate and relay a signal to the host computer 8 to scroll the image in the Y-direction up or down.

Additionally, the scroll wheel assembly 10 includes a lateral movement sensing system 70 having at least one sensor 71 that determines when the cylindrical shaped wheel 40 is experiencing lateral motion. The scroll wheel assembly 10 also includes the controller 11 for interpreting the output from the sensor, converting it to a signal and delivering the signal to the host computer 8. The controller 11 can be any known component or combination of components that can perform these functions. In one embodiment, the controller 11 includes a microprocessor 95 connected to the sensor 71 that generates a signal for the host computer 8 indicating when the wheel 40 is being laterally moved. The generated signal controls the scrolling of the image 1 along the X-axis 5 in response to a force that causes the wheel 40 to move laterally. The signal scrolls the image 1 in a manner that is consistent with the direction and magnitude of the applied force, i.e., either left or right. Lateral movement of the wheel 40 according to the present invention includes both linear (i.e., axi-lateral) movement of the wheel 40 relative to the housing 51 and tilting or pivoting the wheel 40 in a lateral direction.

Figure 8:
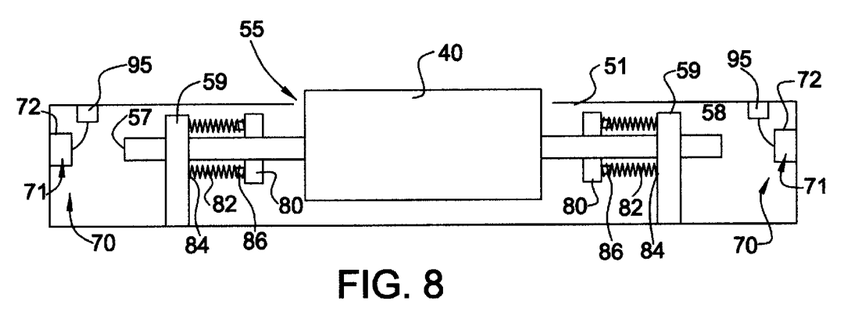
FIG. 8 is a schematic view of the scroll wheel assembly of FIG. 7 including a movement sensing system.
Figure 9:
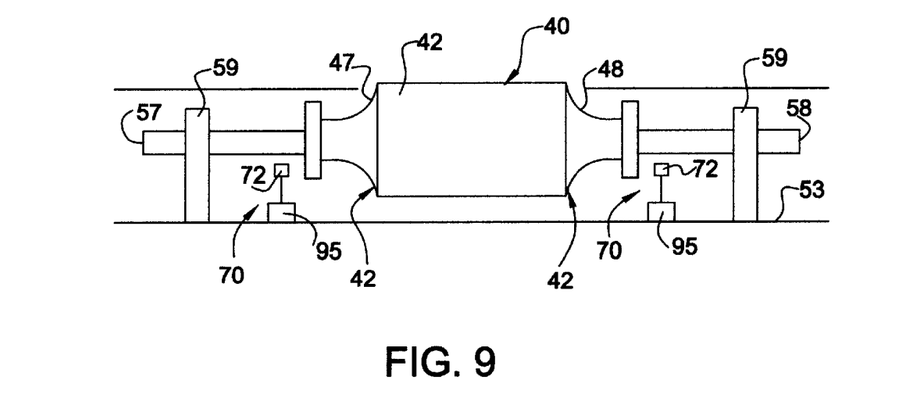
FIG. 9 is a schematic view of a scroll wheel assembly including a movement sensing system according to a second embodiment of the present invention.

As seen in the example of FIG. 8, the sensor 71 may be positioned proximate an end 57, 58 of the shaft 56. Alternatively, the sensor(s) 71 can be secured to an inner surface 53 of the housing 51 as illustrated in FIG. 9 for contacting the sidewalls 42 of the wheel 40. The sensors 71 according to the invention include contact sensors 72, a strain gauges 73 or biased force plates 74 as discussed below. Additionally, other well-known pressure and movement sensors such as optical sensors and/or mercury switches can also be used.

In an embodiment illustrated in FIG. 8, the keyboard 50 includes a contact sensor 72 positioned proximate each end 57, 58 of the shaft 56. These contact sensors 72 may be spaced away from the ends 57, 58 so that minor, unintended lateral movement of the wheel 40 will not result in the shaft 56 making contact with one of the sensors 72. In both of these embodiments, the contact sensors 72 may be positioned at a location that corresponds to the maximum allowable displacement of the shaft 56 within the housing 51.

Contact sensors 72 generate a signal that is interpreted by a microprocessor 95 and relayed to the host computer 8 after they have been contacted by an end 57, 58 of the shaft, a sidewall 42 of the wheel 40 or any other structure extending from the wheel 40 or shaft 56 such as a flange. As a result, when a user wants to move the image 1 along the X-axis 5, he or she will move the wheel 40 laterally relative to the opening 55 so that the shaft 56 slides within the housing 51 in the same direction that he or she desires to scroll until the appropriate contact sensor 72 is engaged. In the embodiment illustrated in FIG. 8, scrolling will start after one end 57, 58 of the shaft 56 makes contact with one of the contact sensors 72. In the alternative embodiment of FIG. 9, the scrolling will start after a sidewall 42 or other portion of the wheel 40 engages one of the contact sensors 72 positioned between the ends 57, 58 of the shaft 56.

The horizontal scrolling may be affected in a number of ways in response to a sensor 72 detecting the lateral movement of the wheel 40, directly or via the shaft 56. In a first embodiment, the image 1 will scroll across the screen 2 at a constant, predetermined speed, i.e., panning. The scrolling speed may be programmed, set, or changed by a user via any known technique. Alternatively, the horizontal scrolling may be time sensitive to the shifting of the wheel 40. For example, the scrolling may be at a first speed when the wheel 40 is laterally displaced for a first period of time. If the wheel 40 is laterally displaced longer than that first period of time, the scrolling speed may be increased. In another arrangement, lateral scrolling can be detected and controlled when lateral movement reaches a specified pressure, as determined by pressure sensors at each end. With the use of pressure sensors in this arrangement, the sensed pressure can also be used to determine the rate of horizontal scrolling. This could be accomplished by the use of pressure sensors with continuous sensing capabilities and by sensing the continuous pressure level, or by the use of pressure sensors with discrete sensing and the determination of one or more levels of pressure.

A system for physically biasing the wheel 40 to a central position is also preferably used. One embodiment for achieving this is shown in FIG. 8. The shaft 56 may include a flange 80 affixed thereto. One or more springs 82 are preferably positioned between the flange 80 and structure on the housing such as support 59. The spring 82 may be cantilever mounted such that it is fixed to the support 59 at one end 84 and frictionally engages the flange 80 at its other free end 86. The spring 82 will bias the wheel 40 to a central position. Preferably, the device includes such an arrangement on both sides of the wheel 40, if desired.

Figure 10:
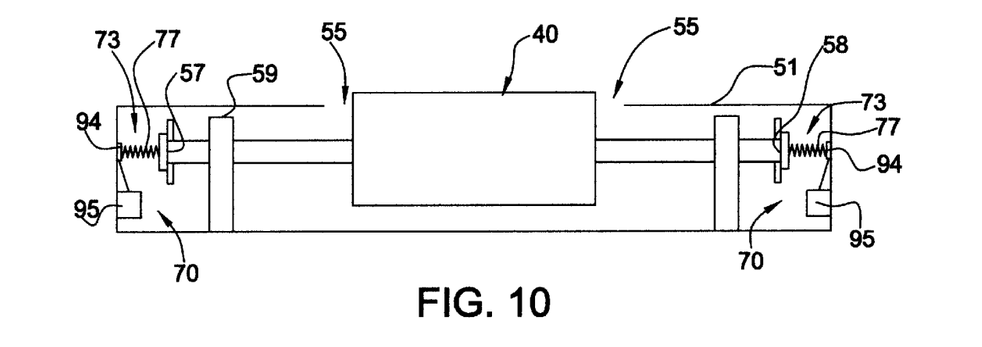
FIG. 10 is a schematic view of a scroll wheel assembly including a movement sensing system according to a third embodiment of the present invention.
Figure 11:
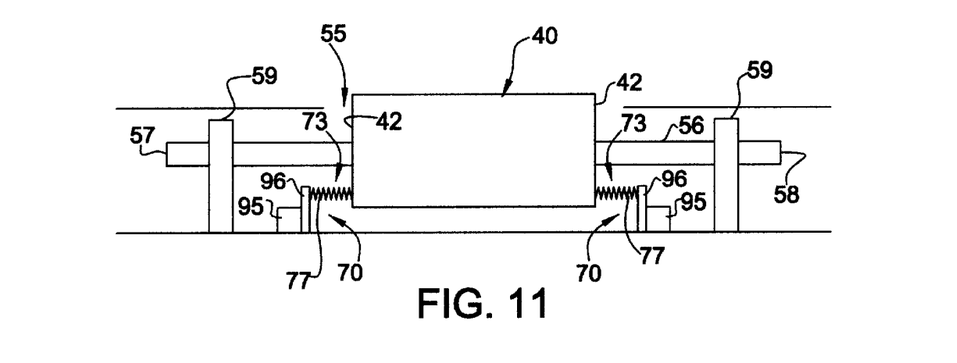
FIG. 11 is a schematic view of a scroll wheel assembly including a movement sensing system according to a fourth embodiment of the present invention.

In the embodiment illustrated in FIG. 10, the sensing system 70 includes sensors, which take the form of two strain gauges 73 that cooperate with the shaft 56 for causing horizontal scrolling. In this embodiment, one strain gauge 73 is positioned at each end 57, 58 of the shaft 56. Alternatively, the strain gauges 73 could be positioned within the housing 51 at locations spaced from the ends 57, 58 for engaging with the sides of the wheel 40 as shown in FIG. 11, or at any other desired location. Each strain gauge 73 may include a compressible/extendable member 77 that is operatively connected to a microprocessor 95 for generating an electrical signal that controls the position of the image 1 relative to the display screen 2 as discussed above. The member 77 is also rotatably coupled to a support member 94 (FIG. 10) or 95 (FIG. 11) so that the member 77 can rotate as the wheel 40 is rotated, or to the wheel 40 so that the wheel 40 will rotate relative to the compressible member 77. If desired, low friction plates may be used.

As seen in both FIG. 10 and FIG. 11, the compressible/extendable member 77 can include or be a spring, such as a helical spring. When the shaft 56 moves in a first direction within the housing 54, the spring 77 of the strain gauge 73 that is opposite the direction of the shaft movement will be extended while the spring 77 of the strain gauge 73 that is in the direction of the shaft movement will be compressed. The strain gauges 73 can be set so that either the compression or extension of their springs 77 will cause the microprocessor 95 to generate a signal that results in horizontal scrolling, and preferably in the direction of the movement of the wheel. Therefore, if the user moves the wheel 40 or the wheel 40 and shaft 56 to the right, it will cause the image to scroll right. Similarly, if the user moves the wheel 40 or the wheel 40 and shaft 56 to the left, it will cause the image to scroll left. The image can move at a constant speed or a speed that is a function of the extension or compressive forces experienced by the spring 77. In these embodiments, the springs 77 also serve to bias the wheel 40 into a central position.

Although the embodiments illustrated in FIGS. 10 and 11 have been described as including two strain gauges 73, it is possible for the present invention to operate properly with only one strain gauge 73. In this instance, the spring 77 of the strain gauge 73 could be secured to one of the ends 57, 58 of the shaft 56 or to one of the sidewalls 42. As a result, when the shaft 56 is moved in a first lateral direction, the spring 77 will be compressed. Similarly, when the shaft 56 is moved in a second lateral direction, the spring 77 will be extended. The strain gauge 73 could be electrically connected to the microprocessor 95 so that when spring 77 is compressed, scrolling occurs in a first direction, and when the spring 77 is extended, scrolling occurs in a second, opposite direction.

Figure 12:
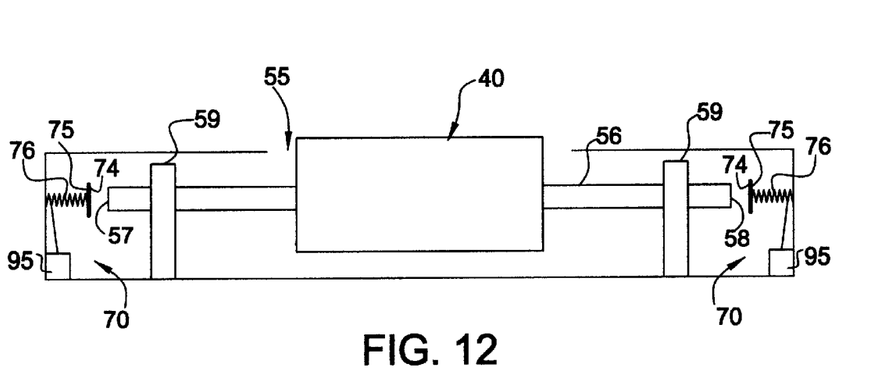
FIG. 12 is a schematic view of a scroll wheel assembly including a movement sensing system according to a fifth embodiment of the present invention.
Figure 13:
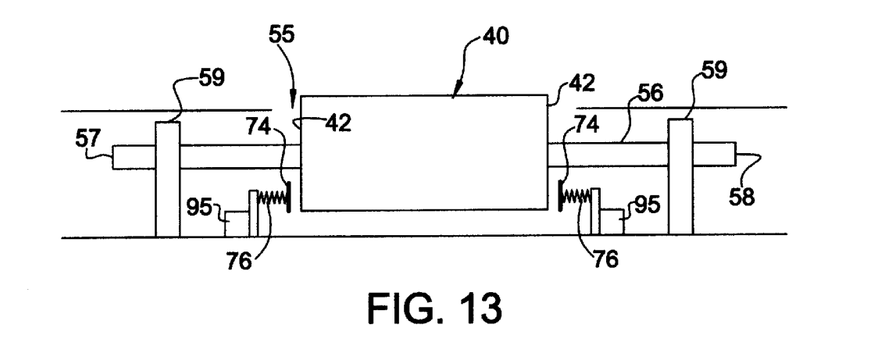
FIG. 13 is a schematic view of a scroll wheel assembly including a movement sensing system according to a sixth embodiment of the present invention.

In the embodiments shown in FIG. 12 and FIG. 13, the force plate 74 includes a contact plate member 75, and a sensor and a spring 76, coupled to a microprocessor 95 so that the image 1 will move in response to one of the springs 76 being compressed. As discussed above, the force plates 74 can each be located at one end 57, 58 of the shaft 56 for cooperating with the ends 57, 58. Alternatively, the force plates 74 can each be located at a point between the end of the shaft 56 and the opening 55 for cooperating with a sidewall 42 of the wheel 40 in response to movement of the shaft 56.

As with the other above embodiments, the shaft 56 preferably slides within housing 51 relative to the opening 55 and the force plates 74 in response to pressure being applied to the wheel 40. As pressure is applied to the wheel 40, one end 57, 58 of the shaft 56 or one of the sidewalls 42 will make contact with the contact plate 75 and begin to compress the spring 76 in the direction that the shaft 56 is moving. In response to the contact being made with the plate 75, an associated controller or microprocessor 95 will generate an image scrolling signal that will be delivered to the host computer 8. Additionally, the rate of compression experienced by the spring 76 can also be interpreted by the microprocessor. In this instance, the microprocessor will generate a signal for controlling the scrolling speed. The scrolling speed could be a function of the compression rate of the spring 76, the force applied to the spring, or a combination of the two. For example, when the plate 75 on the left side of the housing 51 is engaged, the image will begin to scroll to the left at a first rate. As more pressure is applied to the plate 75 and the spring 76, the rate at which the image scrolls will increase.

Figure 14A:
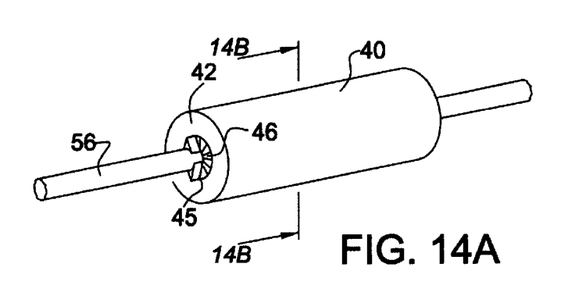
FIG. 14A is a perspective view of a rotatable member that is laterally moveable along a shaft according to the present invention.
Figure 14B:
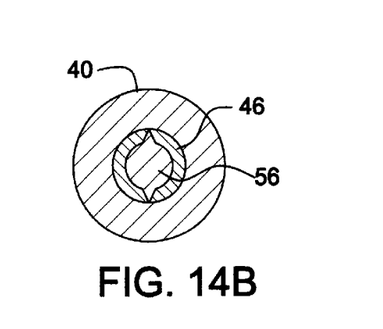
FIG. 14B is a cross section of the rotatable member illustrated in FIG. 14A taken along the line 14 B—B.
Figure 14C:
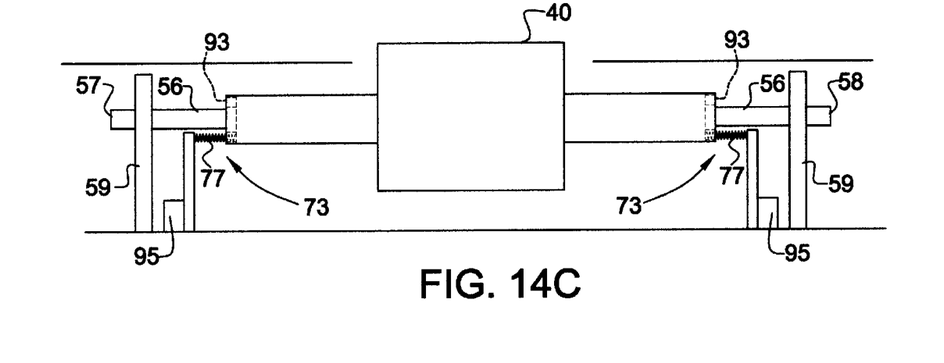
FIG. 14C is a schematic view of a scroll wheel assembly including the rotatable member shown in FIG. 14A with a movement sensing system according to a seventh embodiment of the present invention.

As shown in FIGS. 14a–14c, the wheel 40 can slide along the shaft 56 relative to the housing 54. In this embodiment, the wheel 40 includes a wheel assembly 45 that has an internal bearing surface 46 that can cause the shaft 56 to rotate as the user turns the wheel 40, so that vertical scrolling can occur. The bearing surface 46 also permits the scroll wheel 10 to slide along the shaft 56 within the opening 55 (shown in FIG. 4) in a direction that is parallel to axis 52. Thus, as shown, the external surface of the shaft 56 is shaped complimentary to the internal surface of the wheel 40. The shaft 56 may be secured against movement relative to the keyboard housing 51 in any known manner. As a result, the movement of the wheel 40 along and relative to the shaft 56 determines the direction that the image scrolls across the screen 2. Any of the above-discussed embodiments of the sensing system 70 that contact the sidewalls 42 of the wheel 40 can be used with the embodiment illustrated in FIG. 14. For example, a strain gauge 73 can be coupled to one or both sidewalls 42 of the wheel 40. This can be accomplished in one arrangement by positioning a first end of the spring 77 within a groove 93 at the end of the wheel 40 as shown in FIG. 14C. The opening to the groove 93 may be smaller than a head at the first end of the spring 77 so that the spring 77 will rotate within the groove 93 when the wheel 40 is rotated, and will not pull out of the groove 93 when the wheel 40 is moved laterally. Hence, when the wheel 40 is moved laterally, the spring 77 of the strain gauge 73 will be either compressed or extended. When the spring 77 is compressed or extended, the microprocessor will generate a signal that causes horizontal scrolling.

Figure 15:
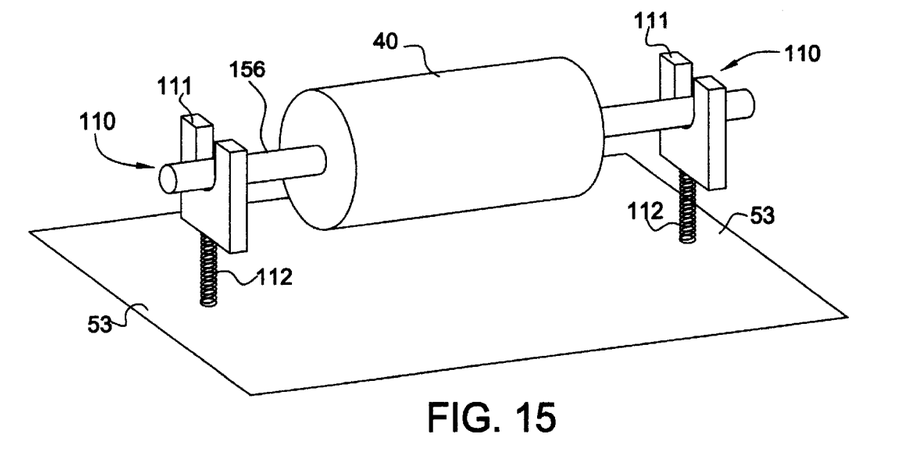
FIGS. 15 and 16 schematically illustrate a scroll wheel assembly including a movement sensing system according to an eighth embodiment of the present invention.

FIG. 15 illustrates an alternative embodiment of the present invention in which the wheel 40 is secured to a floating axle or shaft 156 positioned within the housing 51. Floating, as used herein, relates to the ability of the shaft 156 to move substantially freely in the vertical direction within the housing 51 because the supports 110 holding the shaft 156 are not rigidly positioned within the housing 51. In this embodiment, if the user wants to scroll, he or she will depress and slightly move the wheel 40 laterally within the opening 55 in the same direction that he or she wishes to scroll.

In this embodiment, the shaft 156 is supported by biased supports 110 on opposite sides of the wheel 40. Each biased support 110 includes a cradle 111 for holding the shaft 156 and a biasing member 112 such as a helical or other type of spring. Each cradle 111 can be supported within the housing 51 by a set of vertical receiving slots. These slots can be sized so that enough tolerance exists between the slots and the cradles 111 enabling the cradles 111 to move within their slots in directions other than vertical when the user contacts the wheel 40. Alternatively, the slots can be sized so that the cradles 111 are tightly surrounded by the slots and experience substantially only vertical movement. As a result, in this alternative embodiment, when a user contacts the wheel 40, the cradles 111 will not move laterally relative to the housing or toward the front and back of the housing 51. As shown in FIG. 15, each biasing member 112 may be secured or otherwise coupled to the interior surface 53 of the housing 51.

Figure 16:
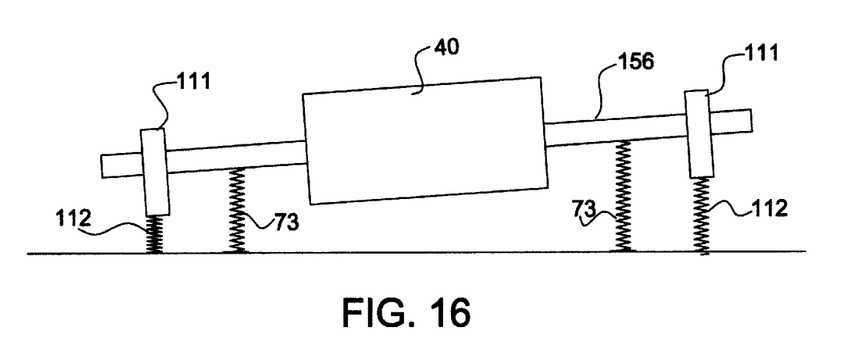

A movement sensing system 70 can be secured within housing 51 for determining the direction of scrolling in response to the movement of the shaft 156. Any of the above-discussed embodiments of the sensing system 70 could be used with the floating shaft 156 to determine when the shaft 56 and/or wheel 40 have been moved and the direction of this movement. As with the other sensing system, the sensing system 70 used with shaft 156 will cause the image 1 to horizontally scroll. If one or more strain gauges 73 are used to determine the movement of the shaft 156, each strain gauge 73 could be connected to one end 57, 58 of the shaft 56 or to one sidewall 42 of the wheel 40 as discussed above. Alternatively, the biasing member 112 could form the resilient portion of the strain gauge 73. In the embodiment illustrated in FIG. 16, the movement of the shaft 156 can be sensed by positioning the strain gauges 73 or the force plates 74 (not shown) below the shaft 156 so that the relative downward forces at the right and left sides of the shaft 156 can be detected.

Figure 17:
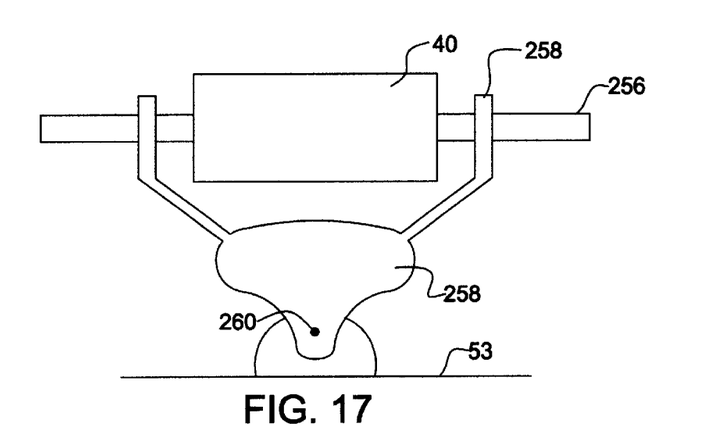
FIG. 17 schematically illustrates a scroll wheel assembly that pivots about an axis within the housing according to the present invention.

In an embodiment illustrated in FIG. 17, the wheel 40 may be secured within the keyboard so that it pivots in response to the application of pressure. In this embodiment, the wheel 40 is supported by a shaft 256 that is held by a bracket 258 or the like that pivots about a fixed shaft 260. The shaft 260 extends perpendicular to the length of shaft 256. Other known ways of pivoting shaft can also be used. In this embodiment, the entire wheel 40 and shaft 256 pivot relative to the housing 51. Therefore, when one side of the wheel 40 is pushed down, the wheel 40 will experience lateral pivotal motion relative to the housing 51 that is sensed by an employed one of the above-discussed position sensing systems 70.

While the scroll wheel assembly 10 is preferably used to cause scrolling in the horizontal direction, it may also be used to provide single commands other than "scroll right" and "scroll left". For example, like with some keys on mice and keyboards, these commands may be programmable. Thus, moving the rotatable member of the scroll wheel assembly 10 to the left can activate a pre-programmed command such as "BACK", and moving the rotatable member to the right can activate a pre-programmed command such as "FORWARD."

Further, with the use of such a wheel, and modifier keys that create the ability to modify the input from the wheel, it is possible to control document zooming or other non-scrolling actions if desired. For example, the combined actions of the Alt and Y keystrokes and manipulation of a scroll wheel controls zooming in and out. If desired, the combination of modifier keys in combination with sliding the scroll wheel horizontally could be used to angularly rotate an image on the display, such as a drawing object. In such an example, the horizontal displacement of the wheel can affect the amount of angular rotation and/or the speed of the rotation.

It is understood that while the forms of the invention herein shown and described include the best mode contemplated for carrying out the present invention, they are not intended to illustrate all possible forms thereof. It will also be understood that the words used are descriptive rather than limiting, and that various changes may be made without departing from the spirit or scope of the invention as claimed below. For example, even though the above discussed embodiments use the rotation of the wheel 30 or 40 to vertically scroll and the translation and/or pivoting of the wheel 30 or 40 to horizontally scroll, it is possible that these functions be reversed so that rotation of the wheel 30 or 40 about shaft 56 results in horizontal. Additionally, the directions that the image is scrolled according to the present invention can include both X and Y components. Additionally, no form of the scroll wheel 10 according to the present invention is limited to a specific type of peripheral device. For example, the disk-shaped wheel 30 could be used with the keyboard 50 and the cylindrical-shaped wheel 40 could be used with the mouse 60. Further, while not illustrated of specifically described, the rotatable wheel and or shaft 56 may be provided with a detent system, as is used in many existing scroll wheels, that can travel with the wheel to make the rotation of the wheel occur at desired increments.

We claim:

1. An input device for scrolling an image relative to an image display screen along perpendicular axes, said device comprising:
    a housing having at least one opening; and
    a scroll wheel assembly provided within said housing, said scroll wheel assembly including a rotatable member that is positioned within said opening, said rotatable member being rotatable about an axis extending within said housing and being laterally movable within said opening relative to said housing, and a movement sensing system that determines when said rotatable member is moved laterally relative to the housing; the movement sensing system configured to sense lateral pressure applied to the rotatable member so as to control a rate of scrolling of an image responsive to an amount of lateral pressure.

2. The input device according to claim 1 wherein said rotatable member is laterally movable along said axis within said opening.

3. The input device according to claim 1 wherein said rotatable member includes a scroll wheel.

4. The input device according to claim 3 wherein said scroll wheel includes a circular disk.

5. The input device according to claim 3 wherein said scroll wheel includes a cylinder having a length that extends parallel to said axis.

6. An input device for scrolling an image relative to an image display screen along perpendicular axes, said device comprising:
    a housing having at least one opening; and
    a scroll wheel assembly provided within said housing, said scroll wheel assembly including a rotatable member that is positioned within said opening, said rotatable member being rotatable about an axis extending within said housing and being laterally movable within said opening relative to said housing, and a movement sensing system that determines when said rotatable member is moved laterally relative to the housing; wherein said movement sensing system includes at least one sensor for determining the amount of time that the user applies pressure to said rotatable member in order to control the scrolling relative to the amount of time that the user applies pressure to the rotatable member.

7. The input device according to claim 6 wherein said rotatable member and said shaft move together relative to said opening when said rotatable member is moved laterally within said opening.

8. An input device for scrolling an image relative to an image display screen along perpendicular axes, said device comprising:
    a housing having at least one opening; and
    a scroll wheel assembly provided within said housing, said scroll wheel assembly including a rotatable member that is positioned within said opening, said rotatable member being rotatable about an axis extending within said housing and being laterally movable within said opening relative to said housing, and a movement sensing system that determines when said rotatable member is moved laterally relative to the housing; wherein said movement sensing system includes at least one sensor for determining the amount of time that the user applies pressure to said rotatable member in order to control the scrolling relative to the amount of time that the user applies pressure to the rotatable member.

9. The input device according to claim 8 wherein said at least one sensor includes at least one of a strain gauge and a pair of contact plates.

10. The input device according to claim 8, wherein said rotatable member is laterally movable along said axis within said opening.

11. The input device according to claim 8, wherein said rotatable member includes a scroll wheel.

12. The input device according to claim 11, wherein said scroll wheel includes a circular disk.

13. A peripheral electronic input device for scrolling an image across a display screen in perpendicular directions, said device comprising:
    a housing;
    a scroll wheel assembly, said scroll wheel assembly including a rotatable member that is laterally movable relative to said housing and a sensor positioned within said housing for sensing lateral movement of the rotatable member; and
    a controller coupled to said sensor, said controller being configured to generate a signal to scroll the image across the display screen; wherein said sensor is configured for determining the amount of time that the user applies pressure to said rotatable member in order to control the scrolling relative to the amount of time that the user applies pressure to the rotatable member.

14. The input device according to claim 13 wherein said sensor includes at least one of a strain gauge and a pair of contact plates.

15. The input device according to claim 13, wherein said rotatable member is laterally movable along said axis within said opening.

16. The input device according to claim 13, wherein said rotatable member includes a scroll wheel.

17. The input device according to claim 13, wherein said scroll wheel includes a circular disk.

18. A method of scrolling an image relative to a display screen using an input device having a housing and a member that is rotatable relative to the housing, said method comprising the steps of:
    receiving input for laterally moving the rotatable member relative to a plane in which said member is rotatable;
    sensing relative changes in lateral pressure applied to the member; and
    controlling a rate of scrolling of an image on the display screen responsive the step of sensing.

19. The method of scrolling as recited in claim 18 wherein said step of laterally moving the rotatable member includes sliding said rotatable member within an opening in the housing.

20. The method of scrolling as recited in claim 18 wherein said step of laterally moving the rotatable member includes the step of pivoting the rotatable member about an axis that extends parallel to said plane.

21. The method of scrolling as recited in claim 18 wherein said step of laterally moving includes the step of applying pressure to a surface of the rotatable member.

22. The method of scrolling as recited in claim 18 wherein said scrolling step includes horizontally scrolling the in response to the laterally moving step; and wherein said method further includes the step of vertically scrolling the image in response to rotation of the rotatable member.

23. An electronic input device providing scrolling capabilities of an image relative to a display screen in first and second perpendicular scrolling directions comprising:

a housing;

a scroll wheel being rotatable relative to the housing about an axis to cause scrolling of the image in the first direction, and said scrolling wheel being displaceable relative to the housing to cause scrolling of the image in the second direction perpendicular to the first direction and to cause said scrolling at a varying rate in the second direction responsive to changes in pressure parallel to said axis.

24. The electronic input device of claim 23 further comprising a controller configured to cause said image to scroll when said scroll wheel is displaced.

25. The electronic input device of claim 23, wherein said computer input device is a computer mouse.

26. The electronic input device of claim 23, wherein said computer input device is a keyboard.

* * * * *